INVENTORS
William R. Harding, Albert W. Kimball
and Lawrence G. Opel.

Patented Jan. 19, 1954

2,666,886

UNITED STATES PATENT OFFICE 2,666,886

CONTROL OF THE HYSTERESIS SPREAD OF ROTATING DIRECT CURRENT MACHINES

William R. Harding, Ebenezer, Albert W. Kimball, Buffalo, and Lawrence G. Opel, Tonawanda, N. Y., assignors to Westinghouse Electric Corporation, East Pittsburgh, Pa., a corporation of Pennsylvania Application September 19, 1951, Serial No. 247,256

5 Claims. (Cl. 322—28)

Our invention relates to the structure and control of electric machines and more particularly to the control of direct-current generators and some structural elements thereof.

When a direct-current generator is utilized for regulating, or amplifying, purposes, it is very often very important that the output voltage follow the control excitation supplied to the generator. Our invention is especially applicable to all types of regulating generators where the hysteresis loop of the machine affects the accuracy of the electric circuit system being controlled.

Our invention is particularly applicable to amplifying regulating generators. For many purposes, such amplifying generators are called upon to provide controlled or regulated output voltage in response to increasing and decreasing input voltage supplied to the signal field winding of the amplifying generator.

For instance, when such an amplifying generator is used for regulating the output voltage of a larger generator, alternator, synchronous condenser, motor, or other dynamo-electric machine, a small amount of power in the output circuit of the regulated machine is fed back into the signal field windings of the amplifying generator to control the output voltage of the amplifying generator. The output voltage of the amplifying generator then reverses its polarity depending upon whether the voltage of the regulated machine departs in one or the other sense from the desired value. In such applications, the control magnetic field induced by the signal field winding goes through a hysteresis cycle due to magnetic retentivity. In the known amplifying generators, in which all the poles have substantially equal retentivity, the hysteresis loop has the normal configuration, and its effect on the output voltage of the amplifying generator has a very noticeably detrimental effect on the accuracy and time constant of the control or regulation performed.

It is one broad object of our invention to improve the performance of an amplifying generator by reducing such hysteresis effects.

To this end, and in accordance with our contribution to the art, we make the main poles of material having low magnetic retentivity, such as annealed "Hipernik" steel, and make the frame of steel hydrogen annealed at 1400° C. so as to provide a frame that is also low in retentivity. The interpoles that are retained are also made of magnetic material with low retentivity.

For every alternate space for the interpoles, we place a special control pole. These control poles may either be permanent magnet steels, or of some similar material having a considerably higher retentivity than the main poles and other magnetic parts of the magnifying generator. The particular control poles used in one application, not comprising permanent magnets, were made from high carbon #3 tool steel. The pole pieces were heated to 1450° C. and quenched in cold water.

By placing such control poles in alternate spaces normally used for the commutating poles, a control effect on the amplifying generator may be obtained that compensates, or eliminates, the hysteresis effect.

To better understand our invention and to appreciate the advantages of our invention, reference may be had to the more detailed explanation hereinafter given and to the drawing, in which.

Figure 1:
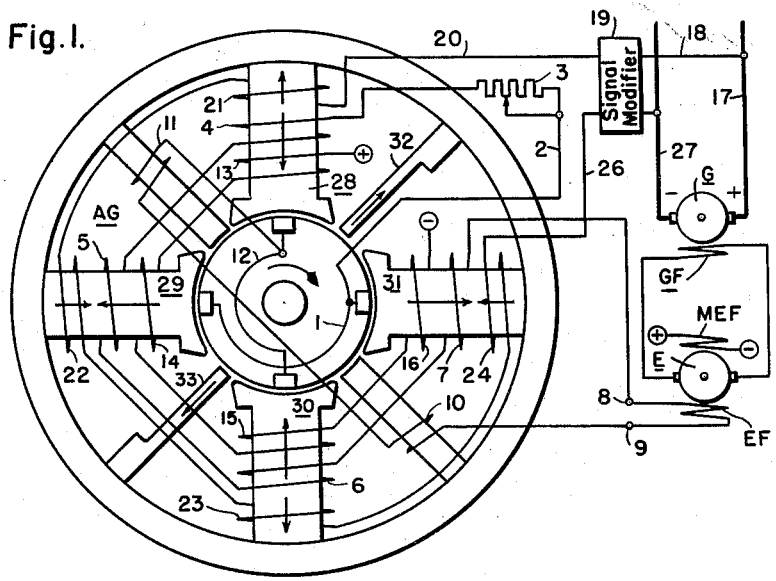
Figure 1 is a diagrammatic showing of one embodiment of our invention as applied to a four-pole amplifying generator used as a regulator for the voltage output of a main generator.

In Figure 1, the amplifying generator AG is shown as having its output terminals 8 and 9 connected to energize the exciter field winding EF of the exciter E. The exciter E has another, or main, field winding MEF to provide a selected average voltage output for the exciter E. The output circuit of the exciter E is connected in a loop circuit with the generator field winding GF of the main generator G, the voltage of which is to be controlled. The amplifying generator output may be connected to other electric systems that are to be controlled. All three of the dynamo-electric machines AG, E, and G are driven at a constant speed by means of one or more constant speed electric motors, not shown.

The load, or output circuit, of the amplifying generator may be traced from the armature terminal 1, conductor 2, tuning rheostat 3, the pole windings 4, 5, 6, and 7, output terminal 8, field winding EF, output terminal 9, the windings 10 and 11 on the commutating poles to the other armature terminal 12. The output circuit is so tuned that the resistance line falls substantially on the straight portion of the no-load saturation curve of the amplifying generator AG.

The amplifying generator is provided with the pattern field windings 13, 14, 15 and 16 energized in the sense indicated, and is provided with a signal, or control, field winding comprising the windings 21, 22, 23 and 24. The circuit for the control field windings may be traced from the positive lead, or bus 17 of the generator G through conductor 18, signal modifier 19, conductor 20, field windings 21, 22, 23 and 24, conductor 26, the signal modifier 19 to the negative bus 27.

The magnetic effects of the windings 21, 22, 23 and 24 on the poles 28, 29, 30 and 31 are opposite, respectively, to the magnetic effects on these poles by the windings 13, 14, 15 and 16. The adjustment may be such, however, that for normal voltage on the buses 17 and 27, the polarities of the poles 28, 29, 30 and 31 will be as indicated with the amplifying generator operating not very far up on its no-load saturation curve. With an adjustment, as specified, the amplifying generator will have a small but definite output to the field winding EF with the armature terminal 1 being positive and the armature terminal 12 being negative. Under these conditions, it is apparent that the field windings 4, 5, 6 and 7 aid the pattern field windings 13, 14, 15 and 16, respectively. It is, however, not a requirement that the amplifying generator operate at any fixed positive output, but can operate buck or boost at any level.

If for any reason the voltage of the generator G drops, the current in the field windings 21, 22, 23 and 24 decreases with the result that the excitation effect of the pattern field windings becomes more dominant and in consequence, the output of the amplifying generator increases to re-establish the proper voltage on the buses 17 and 27.

If the voltage of the generator G increases above the desired value, the current in the field windings 21, 22, 23 and 24 increases. When the magnetomotive forces of the field windings 21, 22, 23 and 24 exactly balance the respective magnetomotive forces of the field windings 13, 14, 15 and 16, the output of the amplifying generator should be zero. This is the requirement of the desired control function. In the absence of our invention, the output voltage of the amplifying generator is, however, not zero. The residual flux still makes the poles 28, 29, 30 and 31 have the polarities indicated. The actual output voltage of the amplifying generator is thus highly detrimental to the accuracy and time constants of the regulating performance.

Figure 3:
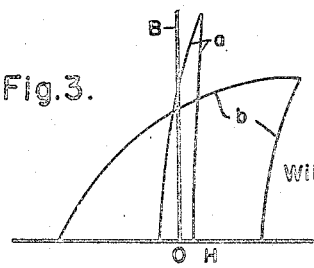
Fig. 3 shows some curves of aid in disclosing our invention.

In Fig. 3, the curves $a$ show the typical magnetization characteristic of the main poles and frame of the amplifying generator. It will be noted that the retentivity of the main poles and frame is low. Curves $b$ show the magnetic characteristics of the special poles having the high retentivity.

From the curves $a$, taken alone, namely without considering the effect of the special control poles, it is apparent that the departure of the actual regulating function from the desired value is quite considerable as the output of the amplifying generator decreases.

We eliminate the erroneous operation by placing two permanent magnet poles 32 and 33 in alternate places of the spaces normally provided for two interpoles. The pole 32 is located with its face mounted between the outside edge of the commutating zone and adjacent to the pole tip of pole 28. The pole 33 is mounted with its face between the outside edge of the commutating zone and adjacent to the pole tip of pole 30. Pole 32 is so placed next to the main pole tip so that its polarity is opposite to the polarity of the pole 28. The pole 33 is similarly placed.

By thus placing the poles 32 and 33, a flux is produced across the air gap to the armature which induces a voltage in the armature conductors that is opposite to the voltage induced by the residual of the main poles. The effect of the residual flux is thus neutralized. By a proper selection of the permanent magnet strength in relation to the residual flux, the residual flux may be neutralized to a large extent, entirely, or even a reverse voltage may be produced.

A further modification for accomplishing substantially the same novel result would be the disposition of a special pole of permanent magnet steel within each of the main poles. Such a pole could be placed in the pole axis of each main pole, but preferably should be so placed as to produce its maximum effect, taking the field distortions of operation into account, in eliminating the residual effects of the main poles. The substantially permanent magnet control pole within the main pole will thus be magnetized by the magnetomotive force of the armature. It is magnetized through a hysteresis loop each time the armature voltage and current go through a cyclic change. The residual flux in the control pole is thus always in the correct direction to oppose the residual in the main pole. In other words, each main pole that is normally a north pole adjacent the armature air gap would house a south control pole at the armature air gap and each main pole that is normally a south pole adjacent the armature air gap would house a north control pole at the armature air gap.

Figure 2:
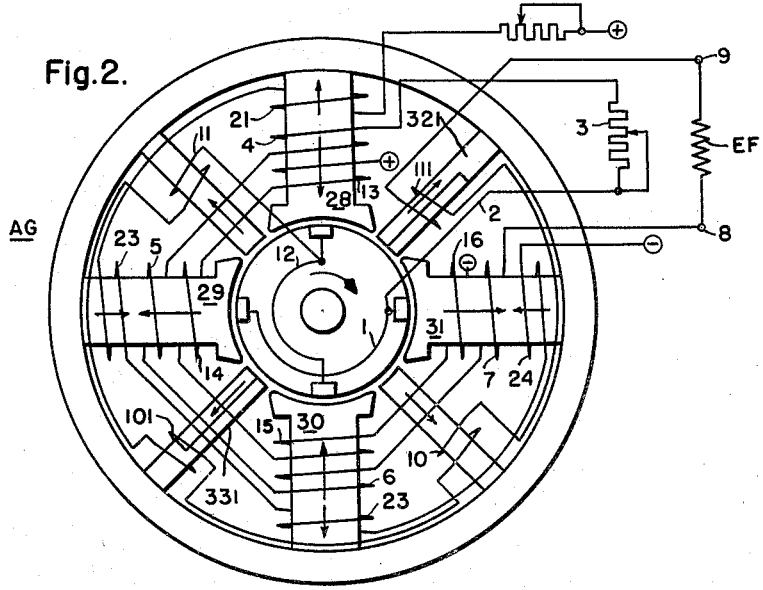
Fig. 2 is a diagrammatic showing of a modification of our invention.

The modification described in the preceding paragraph has the only disadvantage of being rather expensive; whereas, the modifications shown in Figs. 1 and 2 are relatively inexpensive.

A further variation of this principle could be obtained by providing a special pole face on each of the interpoles which would produce a flux across the armature air gap next to the opposite main pole tip. Such interpoles would be made of steel having a considerably higher retentivity than the main poles. This arrangement is shown in Fig. 2, and the hysteresis loop for such a pole is shown by curves $b$ in Fig. 3.

The use of these various special poles hereinabove disclosed should permit the use of non-annealed magnetic parts in some machines now requiring the parts to be annealed to reduce the residual magnetism. This will permit the use of standard pole steel for the main poles instead of "Hipernik."

The particular elements shown in Fig. 2, that are the same in structure, position, and function as in Figure 1, have been given the same reference characters. In lieu of poles 32 and 33, we use the specially designed interpoles 321 and 331 and provide these poles with the commutating series field windings 11 and 101, respectively.

When the voltage output of the amplifying generator is such that terminals 8 and 9 are positive and negative, respectively, for a time and the voltage then drops to swing to an opposite electrical polarity on the terminals, the magnetism induced in the special control poles having high magnetic retentivity by the magnetomotive force of the armature winding will always produce a polarity on the control poles that is opposite to the residual flux in the main poles. The effective spread of the hysteresis loop for the amplifying generator is thus very materially reduced.

While we have disclosed only three modifications of our invention, it being understood that our invention is capable of various adaptations and that changes and modifications may be made or substitutions resorted to which come within the spirit of the invention as set forth in the appended claims.

We claim as our invention:

1. An amplifying direct-current regulating generator, including in combination, a frame, a field structure having in the frame four circumferentially spaced poles alternately of north and south polarities so that the poles of like polarity are diametrically opposite to each other, an armature having a commutator with four brushes in normal use alternately of positive and negative electric polarities, a connection between said positive brushes and a similar connection between the negative brushes, an output circuit connected to the positive and negative connection of said brushes, an electric system controlled by the output current in the output circuit, series field coils disposed on all four poles respectively and disposed in series with the output circuit, said field coils being wound to determine the magnetic polarities of the four poles, an input circuit interconnected with the said electrical system to thus carry a current of a magnitude that is a function of the operation of said electrical system, said input circuit having control windings disposed on all four poles respectively, said control windings being wound to produce polarities on the respective poles for weakening the flux produced by the said series field coils in response to variable signal excitation received from said electrical system, and a residual flux controlling pole, having a high magnetic retentivity, disposed in each of two opposite interpole spaces, the polarity of each control pole adjacent the armature airgap being opposite to the polarity to which the armature magnetomotive force would normally magnetize the main poles, whereby during operation of the generator at low voltage output a voltage is induced in the armature in opposition to the voltage induced in the armature by the residual flux to thus substantially eliminate the effect of the residual flux.

2. An amplifying direct-current regulating generator, including in combination, a frame, a field structure having in the frame four circumferentially spaced poles alternately of north and south polarities so that the poles of like polarity are diametrically opposite to each other, an armature having a commutator with four brushes in normal use alternately of positive and negative electric polarities, a connection between said positive brushes, an output circuit connected to the positive and negative connection of said brushes, said output circuit being tuned so that its resistance line falls on the no-load saturation curve of the generator, an electric system controlled by the output current in the output circuit, series field coils disposed on all four poles respectively and disposed in series with the output circuit, said field coils being wound to determine the magnetic polarities of the four poles, an input circuit interconnected with the said electrical system to thus carry a current of a magnitude that is a function of the operation of said electrical system, said input circuit having control windings disposed on all four poles respectively, said control windings being wound to produce polarities on the respective poles for weakening the flux produced by the said series field coils in response to variable signal excitation received from said electrical system, and a residual flux controlling pole, having a high magnetic retentivity, disposed in each of two opposite interpole spaces the polarity of each control pole adjacent the armature airgap being opposite to the polarity to which the armature magnetomotive force would normally magnetize the main poles, whereby during operation of the generator at low voltage output a voltage is induced in the armature in opposition to the voltage induced in the armature by the residual flux to thus substantially eliminate the effect of the residual flux.

3. An amplifying direct-current generator having main poles having low magnetic retentivities and having magnetically highly retentive control poles mounted adjacent the respective main poles, said control poles having opposite polarities adjacent the armature airgap and small magnitude relative to the respective main poles adjacent to which the control poles are mounted to thus, at low voltage output of the generator, substantially eliminate the hysteresis effect.

4. An amplifying direct-current generator having a plurality of pairs of main poles with alternately north and south poles at the armature airgap, poles of permanent magnets mounted adjacent to the main poles of like polarity but disposed with their poles at the armature air gap so as to be of opposite magnetic polarity to the main poles adjacent to which the permanent magnet poles are mounted, the magnetic magnitude of the permanent magnet poles being low relative to the saturation value of the main poles but being substantially equal to the residual flux in the main poles, whereby the hysteresis effect is substantially eliminated from the amplifying generator.

5. An amplifying direct-current generator comprising a field structure with a pair of salient poles having low magnetic retentivity, an armature structure provided with an armature winding, a pattern field winding excited to produce a magnetmotive force in each of the poles so that one pole would normally be a north pole adjacent the armature airgap and the other pole a south pole adjacent the armature airgap, a signal field winding on each of the poles excited as a function of a signal voltage the magnetomotive force in each of the poles respectively being opposite and substantially equal to the magnetomotive forces in the poles produced by the pattern field windings, a pair of control poles having high magnetic retentivity, one of said control poles being disposed adjacent the trailing tip of one salient pole and the other being disposed adjacent the trailing tip of the other salient pole, whereby the residual flux in the highly retentive control poles will always be in opposition to the residual flux in the salient poles and in consequence the voltage output of the generator follows faithfully and without time delay the changes in the signal voltage.

WILLIAM R. HARDING.
ALBERT W. KIMBALL.
LAWRENCE G. OPEL.

References Cited in the file of this patent
UNITED STATES PATENTS

| Number | Name | Date |
|---|---|---|
| 2,074,236 | Pestarini | Mar. 16, 1937 |
| 2,510,669 | Thomass | June 6, 1950 |